United States Patent Office 3,743,726
Patented July 3, 1973

3,743,726
PSYCHOPHARMACOLOGICAL PREPARATION
David de Wied, Bilthoven, Netherlands, assignor to Akzona Incorporated, Asheville, N.C.
No Drawing. Filed Sept. 10, 1971, Ser. No. 179,519
Claims priority, application Netherlands, Sept. 26, 1970, 7014204
Int. Cl. A61k 27/00
U.S. Cl. 424—177
2 Claims

ABSTRACT OF THE DISCLOSURE

The invention is dealing with a pharmaceutical composition having psychopharmacological activities, said composition is containing a therapeutically acceptable carrier substance and an octapeptide of the general formula:

H-L-Cys-L-Tyr-L-Phe-L-Gln-L-Asn-L-Cys-L-Pro-Y-OR in which

R is hydrogen or a hydrocarbon radical, and
Y is L-Arg or L-Lys, or an acid addition salt of said octapeptide.

---

The invention relates to a pharmaceutical composition having psychopharmacological activity. More particularly the invention is dealing with a composition containing octapeptides of the general formula:

H-L-Cys-L-Tyr-L-Phe-L-Gln-L-Asn-L-Cys-L-Pro-Y—OR in which

R is hydrogen or a hydrocarbon radical, and
Y is L-Lys or L-Arg, as well as the acid addition salts thereof.

Said peptides, albeit in impure and dissolved form, are known from a publication of Du Vigneaud et al., J.A.C.S. 75, 4880 (1953), mentioning a tryptical decomposition of vasopressin in experiments made for the purpose of elucidating the structure of this substance, resulting in two components only, one component of which appeared to be the glycinamide. Of the octapeptides according to Formula I no mention has been made so far of any biological activity.

From Int. J. Neuropharmacol. 157, 4 (1965) is known that in hypophysectomized or posterior lobectomized rats lysine vasopressin.zinc tannate possesses certain psychopharmacological properties. The substance appeared to inhibit the extinction of the conditioned avoidance response but to have also a great pressor activity. Besides the expected pressor activity lysine vasopressin.zinc phosphate proved to have also some behavioural activity, while lysine vasopressin itself caused such a rise of blood pressure that the behavioural activity could only be determined with great difficulty.

Surprisingly it has now been found that octapeptides of the general Formula I, as well as acid addition salts thereof, have a much better behavioural activity, while the pressor activity has disappeared.

The said octapeptides are highly active in two respects: on the one side they stimulate the acquisition of the conditioned avoidance response; on the other side they inhibit the extinction of the conditioned avoidance response. They are pre-eminently suitable for the treatment of mental disorders such as certain forms of neurosis, for example compulsion neurosis, or hypsarrhythmy or other forms of encephalopathy, which are attended with cramp.

The peptides according to the general Formula I can be prepared by any conventional method applied in the manufacture of analogous peptides. For this purpose the amino acids are, if necessary, provided with protecting and/or activating groups and then coupled in the correct order. After the synthesis the protecting groups present in the peptide molecule are removed in a conventional manner, after which the resulting peptide can be converted, if desired, into a salt or a long-acting complex.

Peptides are usually prepared by:

(a) condensing an amino acid or peptide having a protected α-amino group and an activated terminal carboxyl group with an amino acid or peptide the α-amino group of which is free;

(b) condensing an amino acid or peptide having an activated α-amino group and a protected carboxyl group, with an amino acid or peptide having a free terminal carboxyl group and a protected α-amino group;

(c) condensing an amino acid or peptide having a free carboxyl and a protected α-amino group, with an amino acid or peptide having a free amino group and a protected carboxyl group.

Activation of the carboxyl group can take place by converting this group into an acid halide, an azide, anhydride or imidazolide, or into an activated ester such as a cyanomethylester, p - nitrophenylester, trichlorophenylester, N-hydroxyphthalimidester, N-hydroxy-succinimidester or N-hydroxy-piperidinester. The amino group can be activated by, for example, a phosphite amide.

The most conventional methods for the condensation of amino acids or peptides are the carbodiimide method, the azide method, the anhydride method, and the method of the activated esters described in, for example "The Peptides," volume I, 1965 (Academic Press). Furthermore the so-called Solid Phase method of Merrifield (J.A.C.S. 85, 2149 (1963)) can be used for the manufacture of the present peptides.

The free functional groups in the amino acid or peptide, which may not participate in the condensation reaction, are protected effectively by the so-called protecting groups, which can mostly be removed quite easily by reduction or hydrolysis. Thus, for example, the carboxyl group can be protected effectively by, for example, esterification with methanol, ethanol, tertiary butanol, benzylalcohol or p-nitrobenzylalcohol. The amino group is usually protected by acid groups, for example, an acid group derived from an aliphatic, aromatic, araliphatic or heterocyclic carboxylic acid, such as acetic acid, chloro acetic acid, butyric acid, benzoic acid, phenyl carboxylic acid, pyridine carboxylic acid, or by an acid group derived from carbonic acid such as an ethoxy carbonyl group, a benzyloxy carbonyl group, a t-butyloxy carbonyl group or a p-methyloxy-benzyloxy carbonyl group, or by an acid group derived from a sulphonic acid such as a benzenesulphonyl or p-toluene sulphonyl group, but also other groups can be used such as a substituted or unsubstituted aryl or aralkyl groups, for example, a benzyl or triphenylmethyl group.

The tyrosyl group (Tyr) present in the octapeptide contains as extra functional group a hydroxyl group. This group can also be protected, preferably by converting it into a tertiary butyloxy group, but this is not always essential.

The said protecting groups are removed in a conventional manner, mostly by hydrolysis with, for example, trifluoro acetic acid or hydrobromic acid, or by mild reduction.

The direct bond between the two cysteinyl groups present in the octapeptide by a disulphide bridge can be obtained by oxidation of the corresponding peptide with free or protected mercapto groups. This oxidation can be performed by any conventional method applied in the manufacture of analogous peptides, for example, by oxidation with potassium ferricyanide in a weak acid or neutral medium, or by oxidation with iodine in acetic acid, or with ethyldiiodide in an organic solvent, or by oxidation with air or oxygen, for example, in water or liquid ammonia.

The esters and acid addition salts of the octapeptides of the general formula are prepared in the conventional manner. As acid addition salts can be used the salts derived from a therapeutically acceptable acid such as hydrochloric acid, acetic acid, propionic acid and, more particularly, from a di- or polybasic acid such as phosphoric acid, succinic acid, maleic acid, fumaric acid, citric acid, glutaric acid, citraconic acid, glutaconic acid, tartaric acid, maleic acid, and ascorbic acid.

Preferably the present peptides are applied as a long-acting complex. Such complexes are obtained by mixing the peptides or salts thereof with suitable organic-polymeric substances or metal compounds such as metal salts, metal hydroxides or metal oxides. Especially poorly or sparingly soluble metal compounds such as metal phosphates, metal pyrophosphates, and metal polyphosphates are preferred. With organic-polymeric substances are meant in this context substances that have already been applied frequently or suggested for application in the preparation of peptides with prolonged activity, such as polyoxy-gelatin, carboxymethylcellulose, polyvinylpyrrolidon, polyphenols, polyalcohols and polymers of copolymers of amino acids, for example, protamine and polyglutamic acid.

Metal compounds which can be used in this process are compounds of metals belonging to the b-groups of the periodic system, for example, cobalt, nickel, copper, iron and, preferably, zinc, or of metals having chelating properties and belonging to the main groups of the periodic system, such as aluminium and magnesium. The metal complexes can be obtained by adding the peptide and a sparingly soluble metal salt, metal hydroxide or metal oxide to an aqueous medium. The complex can also be obtained by adding an alkaline medium to an aqueous solution of the peptide and a soluble metal salt to obtain the insoluble peptide-metalhydroxide complex. Further the complex can be obtained by adding the peptide, a soluble metal salt and a soluble salt to an aqueous, preferably alkaline, medium to obtain an insoluble peptide metal salt complex in situ.

The octapeptides according to Formula I and the salts and esters thereof are preferably applied in the form of injection preparations, for which purpose they have to be dissolved, suspended or emulgated in a liquid. They can also be prepared, however, in the form of an intranasal preparation, such as a liquid or a spray, or in a form suitable for oral administration, such as tablets, pills, capsules or coated tablets, or in the form of suppositories. Dependent on the administering form to be chosen the octapeptides are preferably mixed with one or more pharmaceutically acceptable substances which do not react with the active substances, such as gelatin, mannitol, sorbitol, salt, starch, lactose, magnesium-stearate, talc, polyalkylene glycols, pyrogen-free water, mono or polyvalent alcohols such as ethanol, isopropanol, benzylalcohol or glycerine, vegetable oils and other fatty acid esters such as arachis oil, ricinus oil, ethyl oleate, isopropyl myristate, sorbitan fatty acid ester or polyoxyethylene sorbitain monoleate.

The preparations can be sterilised, if desired, and they may contain auxiliaries such as flavourings and colouring matter, preservatives and stabilizers, as well as buffers or agents for adjusting the osmotic pressure.

Further the preparations according to the invention may contain other active components, for example, antibiotics or antiseptics.

Solutions, suspensions or emulsions for therapeutical administration should preferably contain 0.1–5 mg. of octapeptide per ml. For intravenous, intramuscular or subcutaneous injection 0.1–5 ml. is preferably used; for intranasal administration the dosage may be considerably higher. Preparations intended for oral administration should preferably contain 0.1–100 mg. of octapeptide per dosage unit.

BIOLOGICAL ACTIVITY OF THE OCTAPEPTIDES

Extinction of the conditioned avoidance response

Male white rats were conditioned in the so-called pole-jumping test. The conditioned stimulus was a light presented over the box for 5 seconds, after which the unconditioned stimulus of shock was delivered through the grid floor of the box. For 3 consecutive days ten trials were done each day with an intertrial interval of 60 seconds. Rats which made more than 10 positive responses during these days were used for measuring the degree of extinction of the conditioned avoidance response.

The extinction was studied during the next 3 days using the same procedure as during the learning period, except that no unconditioned stimulus was presented any more after the conditioned stimulus. Ten trials were done each day (so 30 trials in total) with these conditioned rats, which on the 3rd day of the training, immediately after the last experiment, had been treated with the substance to be tested. The total number of positive responses (C.A.R.'s) scored by each rat during this second period of 3 days, served as an index for the degree of extinction of the conditioned avoidance response.

| Substance | Average number of C.A.R.'s per rat | |
|---|---|---|
| | Dose 5 µg. | Dose 1 µg |
| Placebo | 8 | 10 |
| Lysine vasopressin.zinc-phosphate | 15 | 14 |
| Desglycinamido-lysine-vasopressin.zincphosphate | 254 | 25 |

Asquisition conditioned avoidance response

Hypophysectomized rats received training in a so-called shuttle-box. This treatment was started about one week after the operation. In this case the conditioned stimulus was the sound of a buzzer presented for 5 seconds whereupon the unconditioned stimulus of shock was delivered through the grid floor of the box. These conditioning trials, which were done 10 times per day, lasted for a period of 9 days.

The octapeptide was administered subcutaneously every other day, starting on the day prior to the first training day, so on the days 0, 2, 4, 6 and 8. The total number of C.A.R's (in this test no more than 90) served as a measure for the acquisition of conditioned stimulus.

| Substance | C.A.R.'s | | |
|---|---|---|---|
| | 0.5 µg./ 2 days | 5 µg./ 2 days | 20 µg./ 2 days |
| Placebo | 25 | 27 | |
| Lysine vasopressin.zinc phosphate | 34 | 35 | 39 |
| Desglycinamido lysine-vasopressin.zinc-phosphate | 69 | | |

Remarks regarding the following examples:

(I) If no sterical configuration is mentioned the L-form is meant;

(II) The following abbreviations are used with respect to the amino acid groups:

Cys:cysteinyl
Tyr:tyrosyl
Phe:phenylalanyl
Gln:glutaminyl
Asn:asparaginyl
Pro:prolyl
Lys:lysyl
Arg:arginyl (III) The following abbreviations are used with respect to the protecting groups:

Z: benzyloxycarbonyl
Tos: toluene-p-sulphonyl
Bzl: benzyl
$N_2H_3$: hydrazide

PREPARATION STARTING PRODUCTS (A) Synthesis: H-Gln-Asn-Cys(Bzl)-Pro-Lys(Tos)-OH.HCl (A1) Z-Pro-Lys(Tos)-OCH₃

Z-Pro-OH (9.98 gm.) was dissolved in 75 ml. of purified tetrahydrofuran. The solution was cooled down to 0° C., after which 5.7 ml. of triethylamine were added. Then the solution was cooled down further to −10° C., after which 3.8 ml. of ethylchloroformiate were added. Then the reaction mixture was stirred for 15 minutes. To this reaction mixture was added at −10° C. a solution of 14.7 gm. of H-Lys(Tos)-OMe.HCl (J.A.C.S. 81, 3051 (1959)) in 100 ml. of tetrahydrofuran, the pH of which had been adjusted to 7 with triethylamine. The mixture was stirred for a few hours and filtered. The filtrate was evaporated to dryness in vacuo to obtain a foamy substance. Then the residue was dissolved in 300 ml. of dilute ethylacetate and washed with 5% citric acid, water, 5% sodium carbonate and again with water. The organic layer was separated and after having been dried over sodium sulphate, evaporated to dryness in vacuo. The residue was an oily substance.

$R_f$ value in benzene:ethanol (8:2)=0.84 on $SiO_2$.

(A2) H-Pro-Lys(Tos)-OCH₃.HCl

Of the above dipeptide-ester 5 gm. were dissolved in 50 ml. of methanol. To the solution were added 10% palladium on carbon and 1 equivalent HCl. Then hydrogen was bubbled through the reaction mixture while stirring. After the reaction mixture was filtered and the filtrate dried over sodium sulphate and evaporated to dryness in vacuo, after which the residue was washed twice with ether.

$R_f$ value in benzene:ethanol (8:2)=0.16 on $SiO_2$.

(A3) Z-Gln-Asn-Cys(Bzl)-Pro-Lys(Tos)-OCH₃

Z-Glu(NH₂)-Asp(NH₂)-Cys(Bzl)-OH (7.9 gm.—Helv. 38, 1491 (1955)—melting point 188°–191°) was dissolved in 110 ml. of dimethylformamide. The solution was cooled down to −0° C., after which 1.86 ml. of N-ethylpiperidine were added. Then the solution was cooled down further to −10° C., after which 1.82 gm. of secondary butylchloroformiate were added to the mixture. The resulting mixture was stirred for 10 minutes at −10° C., after which a solution of 5.6 gm. of H-Pro-Lys(Tos)-OCH₃.HCl in 35 ml. of dimethylformamide, and 1.75 ml. of N-ethylpiperidine (pH=8) were added. The reaction mixture was stirred for 1 hour at 0° C., then for 2 hours at 20° C. and again for 2 hours at about 40° C. The dimethylformamide was partly distilled off in vacuo and the residue crystallized from ethanol.

Melting point 158–162° C.

$R_f$: in butanol:pyridine:acetic acid:water (4:0.75:0.25:1)=0.78 on $SiO_2$.

(A4) Z-gln-Asn-Cys(Bzl)-Pro-Lys(Tos)-OH

Saponification of the above protected pentapeptide ester in methanol yielded the pentapeptide acid.

Melting point 154–159° C. (dec.).

(A5) Removal of protecting group Z 2 grams of the protected pentapeptide, obtained according to one of the Examples (A3) or (A4) is dissolved in 50 ml. methanol and hydrogenated according to the method as described in Example (A2). The mixture obtained is filtered and the filtrate is dried by evaporation of the solvent. Results:

(A5.1) H-Gln-Asn-Cys(Bzl)-Pro-Lys(Tos)-OH from (A4)

$R_f$=0.27 in butanol:pyridine:acetic acid:water (4:0.75:0.25:1) on $SiO_2$).

(A5.2) H-Gln-Asn-Cys(Bzl)-Pro-Lys(Tos)-OMe from (A3)

$R_f$ in butanol:pyridine:acetic acid:water (4:0.75:0.25:1) on $SiO_2$.

(B) Synthesis: H-Gln-Asn-Cys(Bzl)-Pro-Arg(Tos)-OH.HCl (B1) Z-Pro-Arg(Tos)-OCH₃ and H-Pro-Arg(Tos)-OCH₃.HCl The above dipeptide ester was prepared in the same manner as described in Example (A1) by condensation of H-Arg(Tos)-OCH₃.HCl (BCS Jap. 37, 1465, 1964) with Z-Pro-OH.

$R_f$: in benzene:ethanol (8:2)=0.80 on $SiO_2$;
$[\alpha]_D^{20}$=−44° (c.=1 in ethanol).

The depeptide was hydrogenated in the manner described in Example (A2) to obtain the hydrochloric acid addition salt of H-Pro-Arg(Tos)-OCH₃.

$R_f$: in amylalcohol:pyridine:water (5:3:2)=0.44 on $SiO_2$. The substance was immediately used for further reactions.

(B2) Z-Gln-Asn-Cys(Bzl)-Pro-Arg(Tos)-OMe

The mixed anhydride mentioned in Example (A3) is added to a solution of 5.2 gr. H-Pro-Arg(Tos)-OMe.HCl (B1) in dimethylformamide and 1.75 ml. N-ethylpiperidine.

After stirring the mixture (1 hour at −10° C., 2 hours at 0° C. and 8 hours at room temperature), the solvent (dimethylform) is distilled off. The remaining oily residue is crystallized from ethanol.

Melting point 109–113° C. (dec.).

$R_f$: in butanol:pyridine:acetic acid:water (4:0.75:0.25:1)=0.59 on $SiO_2$.

(B3) Z-Gln-Asn-Cys(Bzl)-Pro-Arg(Tos)-OH

The pentapeptide ester (B2) is saponified with 1.1 equivalent sodium hydroxide in methanol.

Melting point 101–103° C.

$R_f$=0.35 on $SiO_2$ (same solvent as in (B2)).

(B4) Removal of Z 1 gr. of the peptide prepared accordance to (B2) or (B3) is dissolved in 25 ml. of 4 N HBr in acetic acid. After 1 hour the (red solution is poured into 250 ml. of dry diethylether, the mixture is filtered and the residue washed with ether resulting in:

(B4.1) H-Gln-Asn-Cys(Bzl)-Pro-Arg(Tos)-OMe $R_f$=0.29 [1] on $SiO_2$.

(B4.2) H-Gln-Asn-Cys(Bzl)-Pro-Arg(Tos)-OH $R_f$=0.27 [1] on $SiO_2$.

[1] Solvent system: butane:pyridine:acetic acid:water (4:0.75:0.25:1).

EXAMPLE I

Synthesis of H-Cys-Tyr-Phe-Gln-Asn-Cys-Pro-Lys-OH (1) Z-Cys(Bzl)-Tyr-Phe-N₂H₃ (0.67 gm.; melting point 240–244° C.; Helv. 43, 1421 (1956)) was dissolved in 5 ml. of purified dimethylformamide. The solution was cooled down to −20° C., after which 0.4 ml. of 5N HCl in tetrahydrofuran and 0.134 ml. of isoamylnitrite were added. Then the reaction mixture was stirred for 5 minutes, after which a solution of 1.1 mmol H-Gln-Asn-Cys(Bzl)-Pro-Lys(Tos)-OH.HCl (A5.1) and triethylamine (pH=8) was added. The reaction mixture was stirred at 0° C. for about 70 hours. Then the mixture was diluted with water and filtered. The residue was dried and then crystallized from a mixture of dimethylformamide, ethylacetate and ethanol.

Melting point 212° C. (decomposition).

$R_f$: in amylalcohol:formic acid:water (7:2:1)=0.85 on $SiO_2$.

(2) One hundred milligrams of the above protected peptide were dissolved in 25 ml. of liquid ammonia. Then sodium was added to the solution, while stirring vigorously, and that in such a quantity that the colour of the solution remained blue for at least 5 minutes. Then the excess of sodium was removed by adding ammonium chloride to the solution. After that the ammonia was removed by evaporation and the residue added to oxygen-free water, after which the pH of the mixture was adjusted to 6.55. Then air was bubbled through the mixture till a negative reaction was obtained examining the presence of SH-groups. After filtration of the reaction mixture, the filtrate was lyophilised.

$R_f$: in butanol:pyridine:acetic acid:water (4:0.75:0.25:1)=0.30 on $Al_2O_3$.

$R_f$: in butanol:pyridine:acetic acid:water (15:10:3:12)=0.35 on Whatman 3 MM.

(3) To an aqueous suspension of the peptide prepared according to 2 an excess of hydrochloric acid was added.

Then the mixture was lyophilised and the hydrochloric acid addition salt isolated.

In an analogous manner the acid addition salt of phosphoric acid and maleic acid were prepared.

The $R_f$ values of these acid addition salts were identical to the $R_f$ value of the free peptide obtained according to 2.

EXAMPLE II

Synthesis: H-Cys-Tyr-Phe-Gln-Asn-Cys-Pro-Lys-OMe

In the same manner as described in Example (I1) the tripeptide azide, Z-Cys(Bzl)-Tyr-Phe-$N_2H_3$ is coupled with the peptide-ester (A5.2) and further converted to the above peptide-ester according to the method described in Example (I2).

$R_f$=0.33 on $Al_2O_3$ in butanol:pyridine:acetic acid:water (4:0.75:0.25:1).

EXAMPLE III

Synthesis of H-Cys-Tyr-Phe-Gln-Asn-Cys-Pro-Arg-OH (1) In the same manner as described in Example (I1) Z-Cys(Bzl)-Tyr-Phe-$N_2H_3$ (melting point 240–244° C.) was condensated with H-Gln-Asn-Cys(Bzl)-Pro-Arg-(Tos)-OH.HBr (obtained according to Example (B4.2))

Melting point of this compound: 233° C. (decomposition).

$R_f$: in amylalcohol:formic acid:water (7:2:1)=0.80 on $SiO_2$.

(2) In the same manner as described in Example (I2) the protecting groups were removed and the cystinyl compound was obtained by oxidation with air at pH 6.55.

$R_f$: in butanol:pyridine:acetic acid:water (15:10:3:12)=0.32 on Whatman 3 MM.

In the same manner the peptide-methylester is prepared using the intermediate peptide (B4.1). $R_f$=0.35 on $SiO_2$ (same solvent as in 2).

EXAMPLE IV

A solution of the octapeptide obtained according to Example (I2) (10.5 mg./ml.), zinc (8.33 mg./ml.) and $Na_2HPO_4$ 2 aq. (3.5 mg./ml.) was adjusted to pH 2 with 1 N HCl. Zinc was added in the form of zinc chloride. Fifteen millilitres of this solution and 0.8 M sodium hydroxide were added simultaneously, while stirring, to 25 ml. of a mixture of the following composition:

| | Mg./ml. |
|---|---|
| Benzylalcohol | 20 |
| NaCl | 4 |

The volume of the suspension was completed with distilled water to 50 ml. The final composition of the suspension was:

| | Mg./ml. |
|---|---|
| Benzylalcohol | 10 |
| NaCl | 6.8 |
| Octapeptide | 3 |
| Zinc | 2.5 |
| $PO_4$ | 0.5 |

In the same manner were prepared the zincphosphate complex of the octapeptide obtained according to Example II as well as the cobalt-phosphate complexes of the relative octapeptides.

EXAMPLE V

A solution was prepared for oral administration of the following composition:

| | | |
|---|---|---|
| Desglycinamido-lysine vasopressin | mg | 0.5 |
| Sorbitol | mg | 200 |
| Sodium benzoate | mg | 1 |
| Ethanol 100% | ml | 0.05 |
| Water (distilled and pyrogen-free) to 1 ml. | | |

EXAMPLE VI

A solution was prepared for injection purposes of the following composition:

| | | |
|---|---|---|
| Desglycinamido-arginine vasopressin | mg | 1.0 |
| NaCl | mg | 9.0 |
| Methyloxy benzoate | mg | 1.2 |
| Distilled, pyrogen-free water | ml | 1.0 |

EXAMPLE VII

A solution was prepared of the following composition:

| | | |
|---|---|---|
| Desglycinamido-arginine vasopressin | mg | 0.5 |
| Mannitol | mg | 20 |
| Water | ml | 1 |

The solution was lyophilised after having filtered in sterile conditions. The lyophilised residue was passed into an ampoule after having been dissolved in 1 or 2 ml. of a physiological salt solution.

In the same manner a solution of:

| | | |
|---|---|---|
| Desglycinamido-arginine vasopressin | mg | 10 |
| Mannitol | mg | 40 |
| Water | ml | 2 | was lyophilised, dissolved in 1 or 2 ml. of a physiological salt solution and passed into an ampoule.

EXAMPLE VIII

A basic granulate was prepared consisting of:

| | Mg. |
|---|---|
| Carboxymethylcellulose | 2.5 |
| Starch | 20.0 |
| Lactose | 68.5 |

This granulate was mixed with 7.5 mg. of desglycinamido-lysine vasopressin, 1 mg. of talc and 0.5 mg. of magnesium stearate, after which the mixture was compressed into 100 mg. tablets.

EXAMPLE IX

Mannitol (287 mg.) was granulated by means of an ethanol/water mixture in which 6 mg. of hydroxypropyl-methyl cellulose (Methocel of Dow Chemical) were dissolved. Then 1 mg. of desglycinamido-lysine vasopressin, dissolved in ethanol, was added. Then the substances were mixed, after which the liquid was removed in vacuo by evaporation at 30° C. Then 1 mg. of magnesium stearate and 5 mg. of talc were added to the mixture, after which tablets were compressed of 300 mg. These tablets can be used as lozenges.

EXAMPLE X

The following composition was prepared:

Desglycinamido-lysine vasopressin _____mg__ 10
Distilled water acidified with acetic acid to pH 5.5 _____ml__ 5
NaCl _____mg__ 45
Carboxymethylcellulose _____mg__ 25

This composition is suitable for intranasal administration.

What is claimed is:

1. A pharmaceutical composition having psychopharmacological activities in dosage unit form comprising a therapeutically acceptable carrier and an active substance selected from the group consisting of an octapeptide with the general formula:

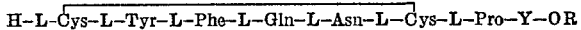

H–L–Cys–L–Tyr–L–Phe–L–Gln–L–Asn–L–Cys–L–Pro–Y–OR and an acid addition salt thereof, in which Formula R is selected from the group consisting of hydrogen and a hydrocarbon radical and Y is selected from the group consisting of L-Lys and L-Arg, said dosage unit containing a psychopharmacologically effective amount of said octapeptide within the range from about 0.5 microgram to about 100 milligrams.

2. The composition of claim 1 in which the carrier is selected from the group consisting of a sparingly soluble salt, hydroxide and oxide of zinc.

References Cited

Du Vigneaud et al.: J.A.C.S. 75, 4880–4881 (1953).

SHEP K. ROSE, Primary Examiner